July 10, 1928.
R. HILL
VALVE
Filed Nov. 14, 1925
1,676,330
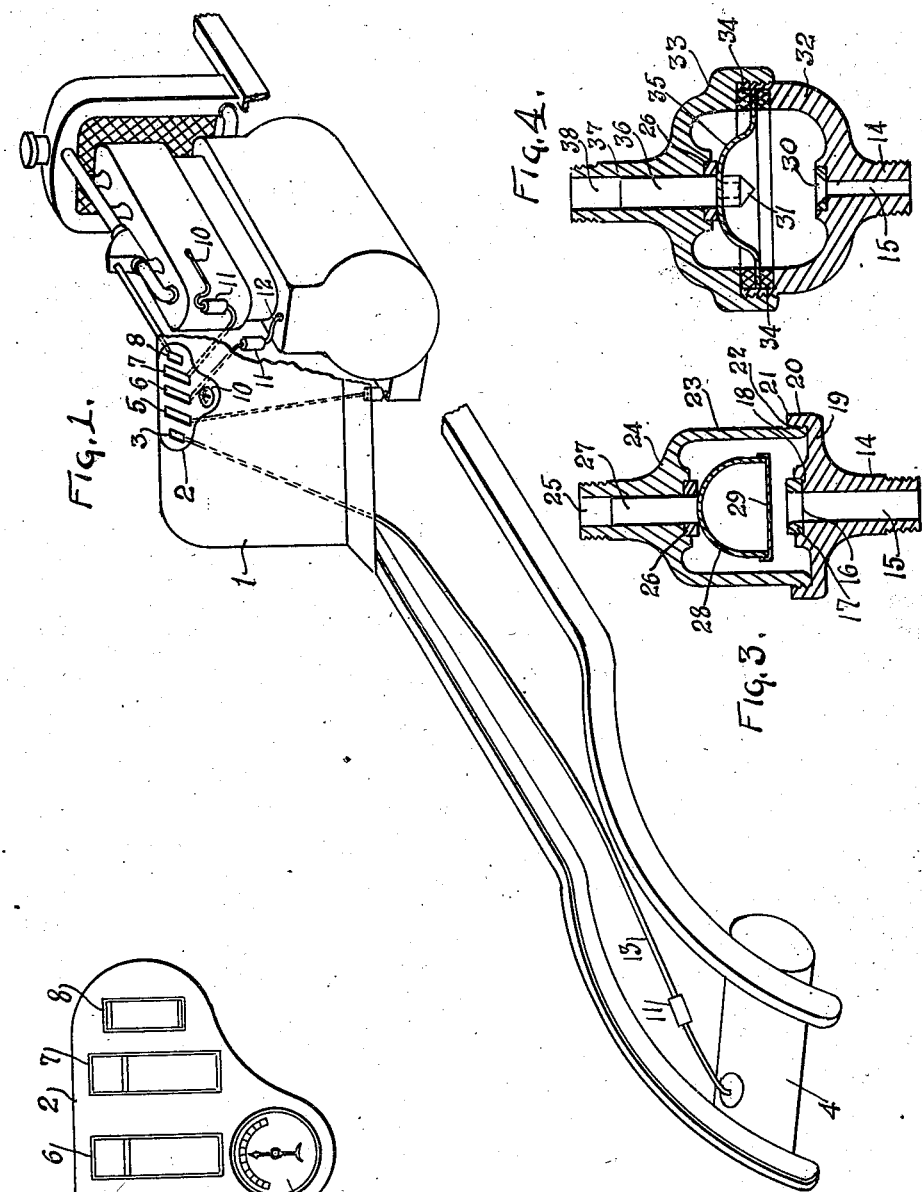
Inventor
REUBEN HILL,
By Toulmin &Toulmin
Attorneys Patented July 10, 1928.

1,676,330

UNITED STATES PATENT OFFICE.

REUBEN HILL, OF WEST HARTFORD, CONNECTICUT, ASSIGNOR TO THE GROLAN MANUFACTURING COMPANY, OF DAYTON, OHIO, A CORPORATION OF DELAWARE.

VALVE.

Application filed November 14, 1925. Serial No. 69,186.

My invention relates to valves and in particular to valves adaptable for use in connection with gauges on automotive equipment.

It is the object of my invention to provide a valve which will effect a positive metering action and insure a predetermined movement of an air or liquid column used in operating liquid level indicating gauges and the like.

It is my object to provide a valve which will act as a seal between a liquid column and an air column or between two different liquid columns, thus permitting the use of a liquid column instead of air for the operation of hydrostatic gauges or other like devices.

It is my object to provide a valve which furnishes a shut-off when the pressure applied to it has moved the metering element its prescribed length, or travel, and will also shut off in the reverse direction when pressure diminishes and a vacuum takes place thereby preventing the extraction of liquids or air from the indicating gauge.

My present application is confined to the valve per se as other applications will be filed to cover the combination of this valve with various types of gauges in which it produces new and novel results.

Referring to the drawings:

Figure 1 is a perspective of a strip chassis with the dash board and one side frame member broken away showing the typical installation of the valve which is the subject matter of the present application, in connection with various types of gauges;

Figure 2 is a view of the dash board panel;

Figure 3 is a section through the valve;

Figure 4 is a section through a modified form of valve.

Referring to the drawings in detail, 1 is a dash board of an automobile on which is mounted a panel plate 2 having gauge indicating devices for indicating the quantity of gas in the tank 4 through the opening 3, the oil level at 5, the oil pump operation at 6, the water height at 7 and the temperature at 8, while the condition of the electrical system is indicated by a meter 9.

The water height is indicated by a hydrostatic gauge generally designated 10, in the line of which is located one of the valves now in question, marked 11.

The oil pump indicating line 12 has a similar valve 11. The hydrostatic gas gauge line 13 has a similar valve 11.

Turning to the specific subject matter of the present application, it will be noted that the valve consists of a lower tubular member 14, having a passageway 15 therein, which terminates at 16. Around this opening 16 is a resilient washer 17 carried in a cup 18 of the bottom 19 of the chamber 20. This bottom has an angular portion 21 internally threaded at 22 for receiving the external threads of the side walls 23 of the chamber. These side walls are carried on a head 24, which is provided with an interior tubular portion 25. Around the lower mouth of this tubular portion 25 is a second resilient washer 26.

Within the tubular member 25 is fitted so that it can move freely but closely adjacent thereto a tubular member 27 which is mounted upon a valve member 28 consisting of a flat bottom portion 29 and a dome portion. This valve member is adapted to move upwardly where it will seal the movement of liquid or gases completely when it is in its uppermost position, and will move downwardly and effect the same result in its lowermost position.

Turning to Figure 4, it will be observed that Figure 4 is provided with a tubular member 14 having a passageway 15 terminating in a flared opening or valve seat 30 in which fits a needle valve member 31 when it is in its lowermost position. The tubular member 14 terminates in a cup 32 on which is threaded an inverted cup 33. Between the cups are mounted packing or washing members 34 carrying between them a diaphragm 35 of rubber, leather or the like, or metal, if desired. In the center of this diaphragm is carried the needle valve 31 which is threaded on a valve stem 36 which is sufficiently restricted in diameter to pass freely within the tubular portion 37 in the passageway 38. A washer 26 is provided around the lower end of this tubular portion or opening 38.

It is apparent that when this diaphragm is in its uppermost position, the upper tubular member will be sealed and when it is in its lowermost position, the tubular portion 33 will be sealed.

As the pressures change the diaphragm on either side, or as they change on either side of the valve member, such as 28, there will be a corresponding movement of the moving parts. A sliding engagement between the tubular member and one of the passageways is of such a character and of such close fit that a substantial seal is effected for practically all liquids utilized in such a structure so that the contents of one passageway will be prevented from entering the other passageway and mixing with the contents thereof.

In the form shown in Figure 3, it is obvious that there can be a slight passage of gas or possibly fluid, but in Figure 4, there will be no passage of such materials.

It will be understood that I desire to comprehend within my invention such modifications as may be necessary to adapt it to varying conditions and uses.

Having thus fully described my invention, what I claim as new and desire to secure by Letters Patent, is:—

1. In a valve, a two-part valve chamber, each part of said chamber having a passageway, a valve member adapted to alternately seal said passageways and means for guiding said valve member in its movement from one position to the other, said guiding means consisting of a tubular member fitting closely within one of said passageways, the close fit of said tubular member being such as to practically seal one passageway from the other, preventing the entrance of the contents of one passageway into the other passageway.

2. In a valve, a two-part valve chamber, each part of said chamber having a passageway, a valve member adapted to alternately seal said passageways and means for guiding said valve member in its movement from one position to the other, said guiding means consisting of a tubular member fitting closely within one of said passageways, the joint between the tubular member and one of the passageways being so arranged as to practically seal the connection between the passageways, and means adjacent the mouth of the passageways for cooperating in the sealing of such passageways when the valve member is in suitable position.

In testimony whereof, I affix my signature.

REUBEN HILL.